United States Patent
Yumita

(10) Patent No.: US 7,873,160 B2
(45) Date of Patent: Jan. 18, 2011

(54) TELEPHONE, TELEPHONE SECURITY CONTROL METHOD, TELEPHONE SECURITY CONTROL PROGRAM AND PROGRAM RECORDING MEDIUM

(75) Inventor: Daisuke Yumita, Kanagawa (JP)

(73) Assignee: NEC Infrontia Corporation, Kanagawa (JP)

( * ) Notice: Subject to any disclaimer, the term of this patent is extended or adjusted under 35 U.S.C. 154(b) by 161 days.

(21) Appl. No.: 12/210,106

(22) Filed: Sep. 12, 2008

(65) Prior Publication Data
US 2009/0110186 A1    Apr. 30, 2009

(30) Foreign Application Priority Data
Sep. 14, 2007 (JP) .............................. 2007-239053

(51) Int. Cl.
*H04M 1/00* (2006.01)
(52) U.S. Cl. ....................................... 379/445; 379/166
(58) Field of Classification Search ... 379/93.02–93.04, 379/188, 189, 194, 195, 445, 161; 455/410, 455/411; 726/25; 380/247
See application file for complete search history.

(56) References Cited

U.S. PATENT DOCUMENTS
2003/0129964 A1 *   7/2003   Kohinata et al. ............ 455/411

FOREIGN PATENT DOCUMENTS
JP        118743 A       1/1997

* cited by examiner

*Primary Examiner*—Tuan D Nguyen
(74) *Attorney, Agent, or Firm*—Sughrue Mion, PLLC

(57) ABSTRACT

Disclosed is a telephone to be installed in a house or an office and capable of effectively preventing leakage of data stored in or unauthorized use of the telephone. For this end, a security button 15 is provided for inhibiting the use of all or a part of the stored data in or functions of the telephone. The security button 15 enables the user to set the security condition by a single push-down operation or choose desired security levels by continuous operations. An LED may be installed in the security button 15 to emit light in different colors or patterns for respective security levels.

23 Claims, 2 Drawing Sheets

TELEPHONE, TELEPHONE SECURITY CONTROL METHOD, TELEPHONE SECURITY CONTROL PROGRAM AND PROGRAM RECORDING MEDIUM

INCORPORATION BY REFERENCE

This application is based upon and claims the benefit of priority from Japanese patent application no. 2007-239053, the disclosure of which is incorporated herein in its entirety by reference.

FIELD OF THE INVENTION

The present invention relates to a telephone, a telephone security control method, a telephone security control program and a program recording medium. In particular, the present invention relates to a stationary (or fixed) telephone set such as, for example, a general telephone that is used by installing at a particular location in a home or an office, an IP telephone, or the like.

BACKGROUND OF THE INVENTION

It is conventional in stationary telephones installed at homes or offices for common use or personal use that any one can use them with no difficulty so long as he/she knows how to use them.

Now, in recent years, stationary telephones are adding various functions other than oral communication function, thereby handling various kinds of data by such telephones.

However, unlike cellular phones that are always carried with their holders, it is possible that the data stored in stationary telephones are leaked to ill willed unidentified persons, especially when the owners of the stationary telephones are absent from their telephones. It is also possible that the telephones are used by someone else without owners' permission.

In order to prevent use by unauthorized person, proposed are telephone sets provided with a security function that restricts operation of such telephones as disclosed in Japanese patent publication no. 11-8743 (JP-A-99-8743) entitled "Communication Terminal" (referred to as the Patent Document 1 below).

However, conventional technologies such as disclosed in the Patent Document 1 have the following problems or drawbacks. That is, setup procedures of the stationary telephones are complicated. They require a plurality of operations and frequent changes of the settings are not easy. As a result, it is typical for most of the users to use such telephones without changing from the initial settings. This means that the user tends to leave the telephone with the initial settings, i.e., without activating the complicated security settings when he/she needs to temporarily leave his/her seat for a short time break or meeting.

SUMMARY OF THE INVENTION

The present invention was made in light of the aforementioned circumstances. It is an object of the present invention to provide a telephone having a button exclusively for security purpose that can be set to the secured position by a single touch, thereby realizing an easy-to-operate and instinctively understandable telephone. The telephone according to the present invention not only improves security but also enables to prevent leakage or unauthorized use of the data stored in the telephone.

In order to solve the aforementioned problems associated with prior art and to achieve the above objectives, the telephone, the telephone security control method, the telephone security control program and the program recording medium according to the present invention are uniquely constructed as follows:

(1) In a telephone to be fixedly installed in a house or an office characterized in the provision of a security button for setting to the security condition wherein a part or all of data stored in the telephone or of telephone functions unusable, thereby enabling the user of the telephone to set the telephone to the security condition by simple operation of the security button.

The telephone, the telephone security control method, the telephone security control program and the program recording medium according to the present invention exhibit the following advantages.

According to the present invention, the stationary telephone that is difficult to carry or move is provided with a security button exclusively for security purpose. The telephone user is able to make the data in the stationary telephone or functions of the telephone usable or usable under restricted conditions by a single operation of the security button. Alternatively, it is possible to set a desired level of restricted usable conditions by plural push-down operations of the security button. By means of this particular function, it is possible by simple operations to prevent unauthorized leakage of the personal data or the common data to any third party or to prevent unauthorized use if any telephone function by the third party.

BRIEF DESCRIPTION OF THE DRAWINGS

In the accompanying drawings.

DETAILED DESCRIPTION OF EXEMPLARY EMBODIMENT

Now, exemplary embodiments of the telephone, the telephone security control method, the telephone security control program and the program recording medium according to the present invention will be described with reference to the accompanying drawings.

Although only the telephone and the telephone security control method according to the present invention will be described hereinafter, the telephone security control method can be implemented as a telephone security control program in such a manner to be executed by a computer. Alternatively, needless to say that such telephone security control program may be recorded in a recording medium in a computer readable manner.

Features of the Present Invention

Prior to the description on the exemplary embodiment of the present invention, unique features of the present invention will be briefly described. The present invention is directed to a stationary telephone (for example, general telephone, IP telephone or the like) that is normally fixedly installed at home in such a manner not to be carried in a daily life. The telephone is provided with a button exclusively for security purpose. The button is operated at least once for preventing the personal data or the common data stored inside the telephone from leaking, unauthorized changes of various settings on the functions of the telephone and unauthorized use of various telephone functions.

Construction of the Present Invention

Figure 1:
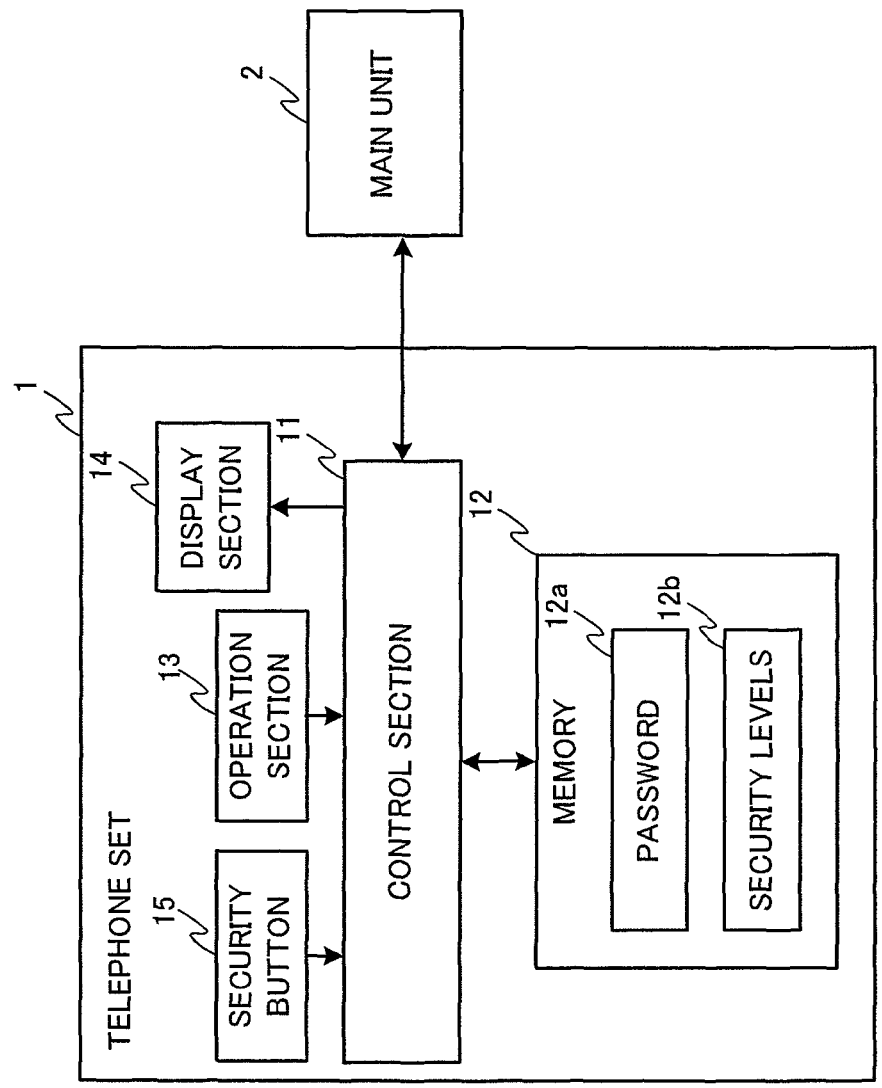
FIG. 1 is an exemplified block diagram to illustrate important circuit parts of the telephone according to the present invention.

FIG. 1 is a block diagram to illustrate important circuit parts of the telephone according to the present invention. In FIG. 1, the telephone 1 comprises at least a control section 11, a memory 12, an operation section 13, a display section 14 and a security button 15. The telephone 1 is connected to a host side main unit 2 for controlling communications between extensions or between extensions and outside lines (or outside calls).

The control section 11 is connected to all sections in the telephone 1 for controlling each of them. It also controls data transmission and receiving to and from the external main unit 2. The operation section 13 comprises operation buttons, numeral keys (ten keys), or the like for performing input operations from the outside, i.e., by the user. It gives various instructions to the telephone 1. The display section 14 is a display device such as a mono chrome or color liquid crystal panel, an organic EL (electroluminescence) panel, or the like. It provides notices of conditions of the telephone 1 to the user or displays demands from the telephone 1.

The security button 15 is a button exclusively for turning ON or OFF the security function. The security button 15 has a built-in LED and the built-in LED is turned ON in response to the push-down of the security button 15. On the other hand, memory 12 comprises a ROM/RAM for storing data that are necessary for the control section 11 to execute the program. Also stored in the memory 12 are password 12a, security level 12b, personal data or the like for security management.

It is to be noted that, as described hereinabove, the main unit 2 is connected to the telephone 1 for controlling communications between extensions or between extensions and the outside line. Common data and the like common to a plurality of telephones are also stored in the main unit 2.

In the telephone 1 in FIG. 1, when the security function of the telephone 1 becomes active by operating the security button 15, functions of the telephone 1 are partly or entirely locked and the current condition (i.e., the locked condition) of the telephone 1 is displayed on the display section 14. The security function can be released by checking the password that is inputted from the operation section 13 and the data associated with the password 12a that is stored in advance in the memory 12.

As understood from the foregoing descriptions, it is possible in this particular embodiment of the telephone 1 to activate the security function in the stationary or fixed telephone that is designed not to be carried unlike a portable telephone or a cellular telephone by the user's very simple operation, thereby preventing personal data or the like in the stationary telephone from leaking to the third party or unauthorized use of the telephone functions by the third party. As described hereinabove, it is to be noted that the password 12a for identifying the user (or users) of the telephone 1 is registered in advance in the memory 12.

The security function of the telephone 1 is activated when the user push down the security button 15. When the user pushes down the security button 15 continuously at this time, the security level changes from "High", "Middle" to "Low" and again to "High" and is displayed on the display section 14 in response to the number of push-down operations. The user can stop pushing the security button 15 while monitoring the display on the display section 14. and the security level displayed at that time is effective. The effective security level is stored in the memory 12 as the data relating to the security level 12b.

Assuming that the security level is "High", restriction of using the telephone is the highest. For example, in this security level, all telephone functions are not usable except the security button 15 in the "High" security level. On the other hand, restriction of using the telephone is low and, for example, only calling function is prohibited in the "Low" security level. In case of the "Middle" security level, the security level is somewhere between the above two levels. It is to be noted, however, that the security level should not be restricted to the above example and may be divided into one or more hierarchy levels.

In the telephone 1 when the security function is enabled, the user is able to operate the telephone 1 within the range that is permitted by the security level 12b. The display section 14 displays the fact that the security function is enabled as well as the security level set by the security function by means of icon, screen saver, characters or the like. When the security function is enabled, the LED installed inside the security button 15 is turned ON.

If the security button 15 is pushed down again under the condition when the security function is enabled as described hereinabove, a screen that prompts the user to enter the password is displayed on the display section 14. The security function of the telephone 1 is released or disabled only if the user enters from the operation section 13 the correct password that coincides with the password 12a that was registered in advance in the memory 12. If the user enters a wrong password, the screen prompting the user to enter the password is again displayed on the display section 14.

In an event when wrong passwords are entered in excess of a predetermined threshold number, all functions of the telephone 1 are disabled so that the telephone 1 is not usable for a predetermined time (operation inhibit time). When the security button 15 is pushed down again after lapse of the predetermined time (operation inhibit time), the screen for prompting the user to enter the password is displayed on the display section 14.

It is to be noted that the security function is enabled again when the security button 15 is pushed down after releasing the security function.

Operation of the Embodiment

Figure 2:
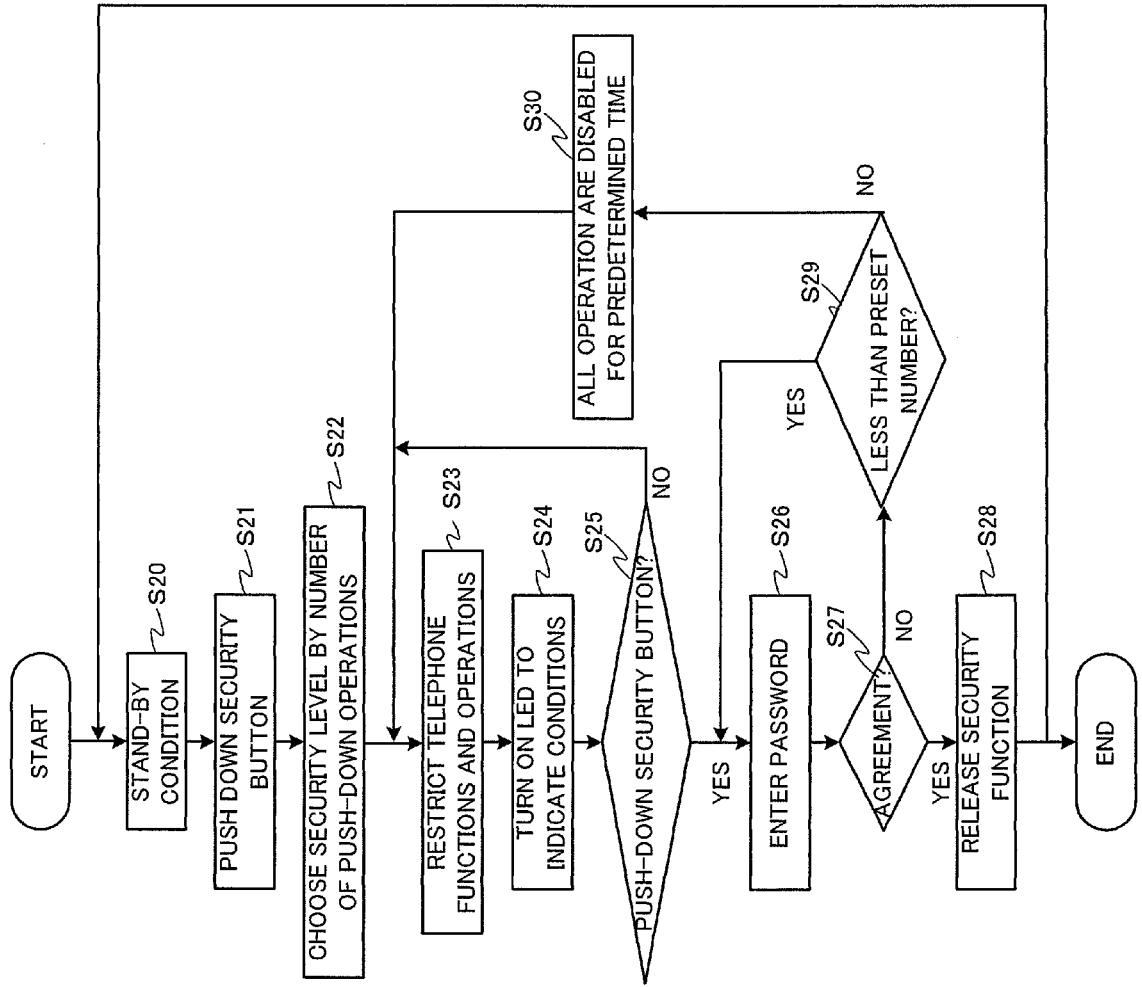
FIG. 2 is a flowchart to show an exemplified operation of the telephone as shown in FIG. 1.

Now, the operation of the exemplary embodiment of the telephone 1 as shown in FIG. 1 will be described with reference to the flowchart in FIG. 2. FIG. 2 is an exemplified flowchart to show the operation on the security button 15 of the telephone 1 as shown in FIG. 1.

Firstly, when the telephone 1 is in the stand-by condition (step S20), the user of the telephone 1 pushes down continuously the security button 15 once or any desired number of times continuously in response to the desired security level (step S21). The control section 11 counts the number of push-downs of the security button 15 to determine the security level depending upon the count, thereby registering the data relating to the security level 12b in the memory 12 (step S22).

Moreover, the control section 11 reads out from the memory 12 the restriction range data indicating the restricted range of use of the telephone 1 corresponding to the determined security level, thereby restricting the operation range of the telephone 1 depending upon the restricted range data. As a result, the security function of the telephone 1 is enabled (step S23). When the security function is enabled, special icon, screen saver, characters or the like indicating that condition is displayed on the display section 14 and also the LED installed in the security button 15 is turned ON (step S24). When the security function is enabled, the telephone 1 is made unusable by the third party in the restricted functions depending upon the security level 12b.

Moreover, the control section 11 notifies to the main unit 2 connected to the telephone 1 that the security function of the telephone 1 is enabled. The main unit 2 returns a warning tone to refuse receiving calls whenever it receives a call to the telephone 1 in the security enabled condition from any extension or the external line.

If the security button 15 is pushed down when the security function is enabled (YES in step S25), the telephone 1 is in the stand-by condition waiting for the password entry and the screen prompting the user to enter the password is displayed on the display section 14. After confirming the display on the display section 14, the user operates the operation section 13 for entering the password (step S26). When the password is entered, the control section 11 reads out the password 12a registered in advance in the memory 12 and checks if the entered password agrees with the registered password 12a (step S27).

If the both passwords agree (YES in step S27), the control section 11 releases the security function of the telephone 1 and sets the telephone 1 to the normal stand-by condition (step S28). If the security button 15 is pushed down again in the normal stand-by condition after releasing from the security function, the security function of the telephone 1 is enabled again.

On the other hand, if both passwords disagree (NO in step S27), the control section 11 adds 1 to the count of the number of continuously entered wrong passwords. The control section 11 compares the data of continuous entries of wrong passwords with the upper limit data of continuously failed password entries (i.e., previously set threshold number) (step S29). If the number of the continuous entries of wrong passwords is equal to or less than the preset upper limit data (YES in step S29), the control section 11 returns to step S26 and the telephone 1 resumes the stand-by condition waiting for the password entry.

On the other hand, if the number of the continuous entries of wrong passwords is in excess of the preset upper limit data of continuously failed password entries (NO in step S29), the control section 11 disables all operations of the telephone 1 including the push-down operation of the security button 15 for a preset constant time as an operation inhibit time (step S30). The data of the constant time (operation inhibit time) is saved in the memory 12. The control section 11 reads out the data on the constant time (operation inhibit time) for setting the time.

After lapse of the preset constant time (operation inhibit time), the control section 11 returns to step S23, thereby returning the telephone 1 to the condition when the security function is enabled.

Advantages of the Embodiment

As described hereinabove, this particular embodiment of the present invention exhibits the following advantages.

That is, according to this embodiment, by operating the security button 15 once or plural times, the user is able to disable or restrict the internal data or the functions of the stationary telephone that is difficult to move or carry. Accordingly, it is possible by a simple operation to prevent the personal data or the common data from leaking to the third party and prevent unauthorized use of the telephone functions by the third party.

Other Embodiments

Other embodiments of the present invention will be described hereinafter. Although the basic construction is identical to the embodiment that has been described hereinabove, other embodiments achieve the following security functions.

(1) Valid/Invalid Function of Pushing Down the Security Button 15

The security button 15 is normally disposed at a location convenient for push-down operation. As a result, there are occasions that the user accidentally touches the security button 15 and incorrectly enables the security function despite the fact that the user uses the telephone 1 at the location where no security function is needed. In order to avoid such thing to occur, it is possible to validate or invalidate the push-down operation of the security button 15, thereby providing the security function more effectively depending upon the situation of using the telephone.

A valid/invalid control of push-down operation of the security button 15 may be achieved in the following manner.

(a) Setting by Software

A valid/invalid set-up screen for push-down operation of the security button 15 is displayed as one of the various set-up screens of the telephone 1 as shown in FIG. 1. When operating the operation section 13 of the telephone 1, the valid/invalid set-up screen for the push-down operation of the security button 15 is displayed on the display section 14, thereby enabling the user to switch valid/invalid of the security button 15.

(b) Setting by Hardware

A mechanical switch is interposed in the wiring between the security button 15 and the control section 11. By switching ON/OFF the mechanical switch, the user is able to switch valid/invalid of the security button 15.

(2) Operation of the Security Button for Releasing the Security Function

When the security button 15 is pushed down while the security function is active, the password entry screen is promptly displayed in the embodiment as described hereinabove. Since entry of wrong passwords is permitted within the predetermined upper limit of continuous failures, there may be a possibility that third party's attempts of entering passwords accidentally coincide with the registered password 12a, thereby releasing the security function.

In order to avoid this to occur, it is possible to change the way of operating the security button 15 by displaying the password entry screen. For example, when the security function is active, a modification is made so that the password entry screen is not displayed unless the security button 15 is pushed down twice (double pushing) or continuously pushed down for an extended time. By changing the way of operating the security button 15 as described hereinabove, a person who has no knowledge of the display procedure in the screen for prompting the user to enter the password encounters difficulties in entering the password, thereby further improving the security of the telephone 1.

Changes of the operation of the security button 15 for releasing the security function will be described hereinafter.

A screen for changing the way of operating the security button 15 for releasing the security function (i.e., an operation method registration screen for registration of the way of releasing the security function) is provided as one of various set-up screens of the telephone 1 in FIG. 1. A screen for changing the operation method of the security button 15 for releasing the security function is displayed on the display section 14, thereby changing the operation method of the security button 15 for releasing the security function.

(3) Changing LED Depending Upon the Security Level

Colors or lighting conditions of the LED built-in the security button 15 may be changed depending upon the security level, thereby permitting the user to easily recognize the security level set by himself/herself.

Ways of lighting the LED depending upon the security level. will be described hereinafter.

(a) Changing LED Color for Each Security Level

An LED or LEDs capable of emitting light in a plurality of different colors is installed inside the security button. Stored in the memory 12 is additional data relating to colors of the light that is emitted from the LED depending upon the security level. As a result, when the security function is enabled, the control section 11 controls the colors that are emitted from the LED for each security level depending upon the LED color data that is read out of the memory 12.

(b) Changing Light Emission Manner from LED for Each Security Level

Additional data relating to the way of light emission from the LED for each security level is stored in the memory 12 as the security level data. As a result, when the security function is enabled, the control section 11 controls the manner of light emission from the LED (e.g., continuous emission, periodical blinking, or the like) depending upon the security level data that is read out of the memory 12.

Now, preferred embodiments of the present invention have been described hereinabove. However, it is to be noted that they are simply examples of implementing the present invention and that the present invention should not be restricted only to these embodiments. It is understood for a person having an ordinary skill in the art that various modifications and alternations can be made without departing from the scope and spirit of the present invention. For example, the present invention may be implemented in the following constructions (2)-(24) in addition to the particular embodiment (1) that has been described hereinabove.

(2) A telephone of the above (1), wherein any operation of the security button is effected only when the telephone is in the stand-by condition.

(3) A telephone of the above (1), wherein one or more security level to represent the range of inhibiting the use of the data stored in the telephone or the telephone functions and the security levels relating to the security to be set to the telephone are switched in response to the number of continuous operations of the security button.

(4) A telephone of the above (1), wherein an LED is installed in the security button and the LED is driven to emit light when the telephone is set to the security condition.

(5) A telephone of the above (4), wherein a plurality of security levels are provided and colors and/or manners of the light emitting from the LED are controlled differently depending upon the security levels set to the telephone.

(6) A telephone of the above (1), wherein means for switching valid/invalid of the operation of the security button is provided.

(7) A telephone of the above (6), wherein the valid/invalid switching means is to display a selection screen on a display section for allowing the user to switch to either valid or invalid of the operation of the security button depending upon the user's selection.

(8) A telephone of the above (6), wherein the valid/invalid switching means is a mechanical switch to be turned ON/OFF by the user and disposed in the wiring for transmitting the operation condition of the security button to the control section.

(9) A telephone of the above (1), wherein a password entry screen is displayed on the display section for prompting the user to enter a password for releasing from the security condition that is set to the telephone, and the releasing from the security condition can be effective if the password entered by the user coincides with the previously registered password.

(10) A telephone of the above (9), wherein an operation procedure registration screen to register in advance the security button operation procedures for displaying the password entry screen is displayed on the display section, thereby enabling the user to set and register any desired operation procedures of the security button as the operation procedures for displaying the password entry screen.

(11) A telephone of the above (9), wherein the password entry screen is displayed again on the display section for prompting the user to reenter the password as long as the number of the unsuccessful password entries entered in response to the password entry screen displayed on the display section does not reach the preset threshold number of times.

(12) A telephone of the above (11), wherein all functions of the telephone are inhibited for a certain time preset as an operation inhibit time if the passwords entered in response to the password entry screen on the display section do not coincide with the previously registered password in excess of the threshold number of times.

(13) A telephone of the above (12), wherein the telephone returns to the security condition preset thereto when it displays the password entry screen after lapsing the time corresponding to the operation inhibit time since all functions of the telephone are set to the inhibit condition.

(14) A telephone security control method for controlling security of a telephone fixedly installed in a house or an office, comprising the step of operating a security button for setting to inhibit the use of all or a part of data stored in or functions of the telephone, thereby setting the telephone to a security condition.

(15) A telephone security control method of the above (14), wherein the operation of the security button is effected in the stand-by condition of the telephone.

(16) A telephone security control method of the above (14), wherein one or plural security levels representing different ranges of inhibiting the use of the data stored in and the functions of the telephone is provided, and the security levels to be set to the telephone are switched in response to the number of continuous operations of the security button.

(17) A telephone security control method of the above (14), wherein validation/invalidation of the operation of the security button can be switched.

(18) A telephone security control method of the above (14), wherein a password entry screen for prompting the user to enter a password for releasing from the security condition is displayed on a display section by operating the security button in the security condition of the telephone, and the security condition is released if the password entered by the user coincides with the password registered in advance.

(19) A telephone security control method of the above (18), wherein an operation procedure registration screen to register in advance the security button operation procedures for displaying the password entry screen is displayed on the display section, thereby enabling the user to set and register any operation procedures of the security button as the operation procedures for displaying the password entry screen.

(20) A telephone security control method of the above (18), wherein the password entry screen is displayed again on the display section unless otherwise the number of passwords entered in response to the password entry screen displayed on the display section disagree with the password registered in advance is not in excess of the threshold number of times, thereby prompting the user to enter the password again.

(21) A telephone security control method of the above (20), wherein all of the operations of the telephone are set to an inhibited condition for a predetermined constant time as an operation inhibit time if the passwords entered in response to the password entry screen displayed on the display section disagree with the password preset in excess of the threshold number of times.

(22) A telephone security control method of the above (21), wherein the telephone returns to the security condition set to the telephone at the time of displaying the password entry screen after lapse of the operation inhibit time since all of the operations of the telephone are set to the inhibit condition.

(23) A telephone security control program for implementing the telephone security control method in the above (14) in a computer executable program.

(24) A program recording medium for recording the telephone security control program of the above (23) in a computer readable recording medium.

What is claimed is:

1. A telephone to be fixedly installed, the telephone comprising:
    a security button for setting a security condition of at least one of data stored in the telephone and functions of the telephone,
    wherein the security button enables a user of the telephone to set the telephone to the security condition by operation of the security button,
    wherein one or more security levels for the telephone are provided, the security levels representing different ranges of inhibiting use of at least one of the data stored in the telephone and the functions of the telephone, and
    wherein the security levels are switched in response to a number of continuous operations of the security button.

2. A telephone of claim 1, wherein any operation of the security button is effected only when the telephone is in the stand-by condition.

3. A telephone of claim 1, wherein an LED is installed in the security button and the LED is driven to emit light when the telephone is set to the security condition.

4. A telephone of claim 3, wherein a plurality of security levels are provided and colors and/or manners of the light emitting from the LED are controlled differently depending upon the security levels set to the telephone.

5. A telephone of claim 1, wherein means for switching valid/invalid of the operation of the security button is provided.

6. A telephone of claim 5, wherein the valid/invalid switching means is to display a selection screen on a display section for allowing the user to switch to either valid or invalid of the operation of the security button depending upon the user's selection.

7. A telephone of claim 5, wherein the valid/invalid switching means is a mechanical switch to be turned ON/OFF by the user and disposed in the wiring for transmitting the operation condition of the security button to the control section.

8. A telephone of claim 1, wherein a password entry screen is displayed on the display section for prompting the user to enter a password for releasing from the security condition that is set to the telephone, and the releasing from the security condition can be effective if the password entered by the user coincides with the previously registered password.

9. A telephone of claim 8, wherein an operation procedure registration screen to register in advance the security button operation procedures for displaying the password entry screen is displayed on the display section, thereby enabling the user to set and register any desired operation procedures of the security button as the operation procedures for displaying the password entry screen.

10. A telephone of claim 8, wherein the password entry screen is displayed again on the display section for prompting the user to reenter the password as long as the number of the unsuccessful password entries entered in response to the password entry screen displayed on the display section does not reach the preset threshold number of times.

11. A telephone of claim 10, wherein all functions of the telephone are inhibited for a certain time preset as an operation inhibit time if the passwords entered in response to the password entry screen on the display section do not coincide with the previously registered password in excess of the threshold number of times.

12. A telephone of claim 11, wherein the telephone returns to the security condition preset thereto when it displays the password entry screen after lapsing the time corresponding to the operation inhibit time since all functions of the telephone are set to the inhibit condition.

13. A telephone according to claim 1, wherein the security button is configured exclusively for switching the security levels.

14. A telephone security control method for controlling security of a fixedly installed telephone, the method comprising:
    operating a security button for a setting that inhibits the use of at least one of data stored in the telephone and functions of the telephone, thereby setting the telephone to a security condition,
    wherein one or plural security levels for the telephone are provided, the security levels representing different ranges of inhibiting use of at least one of the data stored in the telephone and the functions of the telephone, and
    wherein the security levels are switched in response to a number of continuous operations of the security button.

15. A telephone security control method of claim 14, wherein the operation of the security button is effected in the stand-by condition of the telephone.

16. A telephone security control method of claim 14, wherein validation/invalidation of the operation of the security button can be switched.

17. A telephone security control method of claim 14, wherein a password entry screen for prompting the user to enter a password for releasing from the security condition is displayed on a display section by operating the security button in the security condition of the telephone, and the security condition is released if the password entered by the user coincides with the password registered in advance.

18. A telephone security control method of claim 17, wherein an operation procedure registration screen to register in advance the security button operation procedures for displaying the password entry screen is displayed on the display section, thereby enabling the user to set and register any operation procedures of the security button as the operation procedures for displaying the password entry screen.

19. A telephone security control method of claim 17, wherein the password entry screen is displayed again on the display section unless otherwise the number of passwords entered in response to the password entry screen displayed on the display section disagree with the password registered in advance is not in excess of the threshold number of times, thereby prompting the user to enter the password again.

20. A telephone security control method of claim 19, wherein all of the operations of the telephone are set to an inhibited condition for a predetermined constant time as an operation inhibit time if the passwords entered in response to the password entry screen displayed on the display section disagree with the password preset in excess of the threshold number of times.

21. A telephone security control method of claim 20, wherein the telephone returns to the security condition set to the telephone at the time of displaying the password entry screen after lapse of the operation inhibit time since all of the operations of the telephone are set to the inhibit condition.

22. A telephone security control program for implementing the telephone security control method in claim 14 in a computer executable program.

23. A program recording medium for recording the telephone security control program of claim 22 in a computer readable recording medium.

* * * * *